US008395858B1

(12) United States Patent
Han et al.

(10) Patent No.: US 8,395,858 B1
(45) Date of Patent: *Mar. 12, 2013

(54) METHODS AND APPARATUS FOR PERFORMING INTERPOLATED TIMING RECOVERY

(75) Inventors: Ke Han, Fremont, CA (US); Nitin Nangare, Santa Clara, CA (US); Zining Wu, Los Altos, CA (US); Gregory Burd, San Jose, CA (US); Michael Madden, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/285,772

(22) Filed: Oct. 31, 2011

Related U.S. Application Data

(63) Continuation of application No. 12/323,247, filed on Nov. 25, 2008, now Pat. No. 8,049,983.

(60) Provisional application No. 60/990,799, filed on Nov. 28, 2007, provisional application No. 60/991,491, filed on Nov. 30, 2007.

(51) Int. Cl.
*G11B 5/09* (2006.01)
*G11B 5/035* (2006.01)

(52) U.S. Cl. ............................................. 360/51; 360/65
(58) Field of Classification Search ...................... None
See application file for complete search history.

(56) References Cited

U.S. PATENT DOCUMENTS

| 5,901,010 A | 5/1999 | Glover et al. |
| 6,009,549 A | 12/1999 | Bliss et al. |
| 8,049,983 B1 * | 11/2011 | Han et al. ........................ 360/51 |

* cited by examiner

*Primary Examiner* — Daniell L Negron

(57) ABSTRACT

Methods and apparatus are provided for performing interpolated timing recovery using a frequency and phase estimate. An analog signal representing a sector is asynchronously sampled and stored in a storage device. A retiming circuit reads the stored samples and, based on first portions of first and second timing portions of the sector, determines phase adjustments. The retiming circuit generates a signal representing the samples at the adjusted phase and determines sample shift adjustments based on the generated signal and second portions of the first and second timing portions. The retiming circuit computes start and end indices of the sector in the buffer based on the sample shift adjustment and phase adjustment. The start and end indices may be used to compute a frequency estimate. The frequency estimate and a phase adjustment is used to interpolate the asynchronous samples at the appropriate frequency and phase.

20 Claims, 11 Drawing Sheets

METHODS AND APPARATUS FOR PERFORMING INTERPOLATED TIMING RECOVERY

CROSS REFERENCE TO RELATED APPLICATIONS

This application claims priority to U.S. application Ser. No. 12/323,247, filed Nov. 25, 2008, which claims the benefit of U.S. Provisional Application Nos. 60/990,799, filed Nov. 28, 2007 and 60/991,491, filed Nov. 30, 2007, each of which is hereby incorporated by reference herein in its entirety.

BACKGROUND

The present invention is directed to methods and apparatus for performing interpolated timing recovery (ITR), and more particularly to using an estimated frequency and phase of an asynchronously sampled sector to perform timing recovery.

In magnetic storage systems, a read head reads back data stored on a disk platter by analyzing the magnetic field generated by a particular storage region (e.g., a sector or data sector). The read head generates an analog signal representing the storage portions as the read head passes over various disk sectors. The analog signal is sampled and processed in the digital domain, by for example, using a Baud-rate sampling process. It is desirable to have the sampling rate be the same as the binary data rate for optimal data sampling.

Additionally, it is desirable to select an optimal sampling phase out of all the possibilities between 0 and 1 clock cycles for use in processing the data. Timing recovery is performed to determine the optimal sampling rate (i.e., sampling frequency) and the optimal sampling phase.

Typically, timing recovery in magnetic recording systems is decision aided. In particular, a Viterbi detector provides information (e.g., bit decisions) to a phase-loop and/or a frequency-loop in a closed-loop continuous manner as signals are read back from the disk. However, the Viterbi detector has a high raw bit-error-rate (BER) for low signal-to-noise ratio (SNR) signals casing instability in the frequency and/or phase loops.

Compensation for this instability is performed by maintaining a minimum bandwidth at the timing loop. However, a frequency offset may still be present which can be compensated by avoiding a bandwidth that is too small. Traditional systems must operate under these competing demands to provide optimal timing recovery.

Accordingly, it is desirable to provide enhanced systems and methods for performing timing recovery under optimal bandwidth conditions.

SUMMARY

In accordance with the principles of the present invention, methods and apparatus are provided for performing interpolated timing recovery, and more particularly to using an estimated frequency and phase of an asynchronously sampled sector to perform timing recovery.

An analog signal representing a sector is read back from a magnetic storage device and provided to an analog-to-digital converter (ADC). The ADC samples the analog signal asynchronously and stores samples representing the sector in a storage device which may be a buffer. The frequency used by the ADC may be arbitrary but may correspond to the frequency at which the data was initially stored on the magnetic storage device or the clock frequency used to operate the system. The offset which may be introduced by the ADC due to the asynchronous sampling is compensated for by a retiming circuit. The sector that is read back from the magnetic storage device includes three parts. The sector includes a data block between two timing blocks, where one timing block may include a preamble and a first sync mark (SM) and the second timing block may include a postamble and a second sync mark. The data block may be adjacent to the two sync marks.

A retiming circuit may process the samples stored in the buffer in two stages. During the first stage, the retiming circuit may determine a frequency/phase offset based on the preamble and/or postamble portions of the timing blocks and the first and second sync marks. This may be accomplished by first comparing the sample values of the preamble/postamble to the ideal sample values (which may be calculated based on the preamble/postamble data patterns and a target channel polynomial (e.g., a sinusoid with a particular frequency). In particular, the frequency/phase offsets may be determined based on the target polynomial and values produced by convoluting the target polynomial with the preamble or postamble portion of the timing blocks. The target channel polynomial may represent a transfer function associated with a discrete-time channel that includes magnetic storage medium characteristics, analog front end 110, ADC 120 and/or any other component(s) in the signal path between the magnetic storage medium and FIR 320 of timing recovery circuit 140 (FIGS. 1 and 3). It is referred to as the target channel polynomial because it represents the target for the FIR equalizer to equalize a given transfer function associated with the entire communication channel to the target polynomial. For a preamble portion of the samples being input to FIR 320, the output of FIR 320 may resemble a sinusoidal waveform. The ideal values of a subset of the samples of the preamble (e.g., 4 samples) may be determined by the target channel polynomial and the bit pattern of the preamble. The temporal distance between the two sets of samples (i.e., the real and the ideal samples) may represent the phase adjustment. The asynchronous samples may be used to interpolate (or reconstruct) a sampled signal based on the phase adjustment. Secondly, the interpolated samples from the first timing block (corresponding to the preamble) may be used to determine the location of the first sync mark. Similarly, the interpolated samples from the second timing block (corresponding to the postamble) may be used to determine the location of the second sync mark. The sync mark locations may be determined using a correlation type detection.

The retiming circuit may subsequently in the first stage determine a sample shift adjustment (e.g., an estimated frequency offset) of the asynchronous samples. The retiming circuit may compute a frequency estimate based on a function of the phase adjustments, locations of the first and second sync marks and a known number of bits in the data block.

During a second stage, the retiming circuit may receive the frequency estimate and the estimate of the sampling phase (corresponding to the preamble portion of the first timing block) and the asynchronously stored samples and interpolate (or generate) a signal representing the asynchronous samples at the appropriate (adjusted) frequency/phase. The output of the retiming circuit may be filtered and provided to utilization circuitry (e.g., a Viterbi circuit) for further processing. The output of the utilization circuitry may be fed back to the retiming circuit to form a closed-loop circuit that continuously adjusts the phase/frequency of an asynchronously read back sector.

In some embodiments, multiple sectors may be processed by different parts of the interpolating retiming circuit in parallel. For example, in a first pipeline stage, an analog signal may be asynchronously sampled and stored in a buffer. In a second pipeline stage, the frequency estimate (including frequency/phase and sample shift adjustment) may be determined. In a third pipeline stage, the asynchronous samples may be interpolated to generate digital samples at the appropriate frequency/phase.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

This invention generally relates to performing interpolated timing recovery. For illustrative purposes, this invention will be described in the realm of a signal that is read back from a head-media drive (e.g., magnetic storage device) but it should be understood that this invention is applicable to any type of signal that is sampled and for which a sampling frequency/phase offset needs to be determined.

Figure 1:
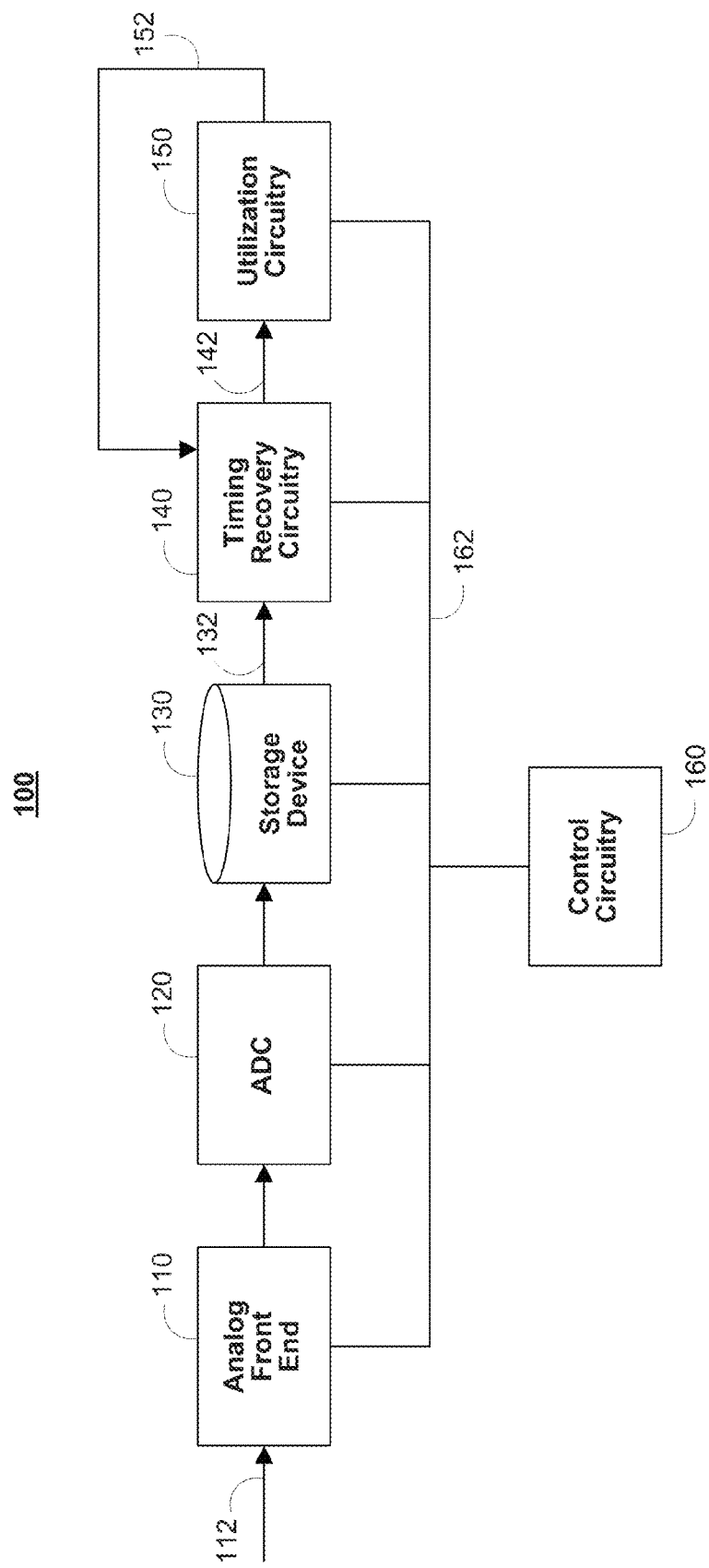
FIG. 1 is a diagram of an illustrative interpolated timing recovery system in accordance with an embodiment of the present invention.

FIG. 1 is a diagram of an illustrative interpolated timing recovery system 100 in accordance with an embodiment of the present invention. Interpolated timing recovery system 100 includes an analog front end 110, an ADC 120, a storage device 130, timing recovery circuitry 140, utilization circuitry 150 and control circuitry 160. Analog front end 110 receives a signal read back from a head media drive 112 that includes information associated with a sector of the magnetic storage medium. Analog front end 110 may include initial analog processing circuitry, such as, a high pass filter, an equalizer and/or a noise reducer. The analog signal processed by analog front end 110 is provided to ADC 120 to be converted to digital form for performing timing recovery and/or any back-end processing in the digital domain.

ADC 120 receives the analog signal representing the sector of the magnetic storage medium and asynchronously samples the analog signal to convert the analog signal to digital form (i.e., the analog signal is quantized to a finite number of values which can be readily expressed by binary numbers). In conventional timing recovery systems, the analog-to-digital converter was part of a closed-loop that included a phase/frequency detector for adjusting the phase/frequency at which the analog signal was sampled. In accordance with an embodiment of the invention, ADC 120 samples the analog signal asynchronously (i.e., without a phase/frequency detector) at an arbitrary frequency (e.g., an expected frequency or the operating frequency of the circuit) that may correspond to the frequency used to store the samples onto the magnetic storage medium. In particular, it should be understood that the exact locations of the bits associated with the analog signal are not important at this stage.

The frequency/phase at which ADC 120 samples the analog signal is not critical since subsequent system components (e.g., timing recovery circuitry 140) are used to determine the phase and/or frequency of the asynchronously sampled analog signal (as will be discussed in more detail below).

Figure 2:
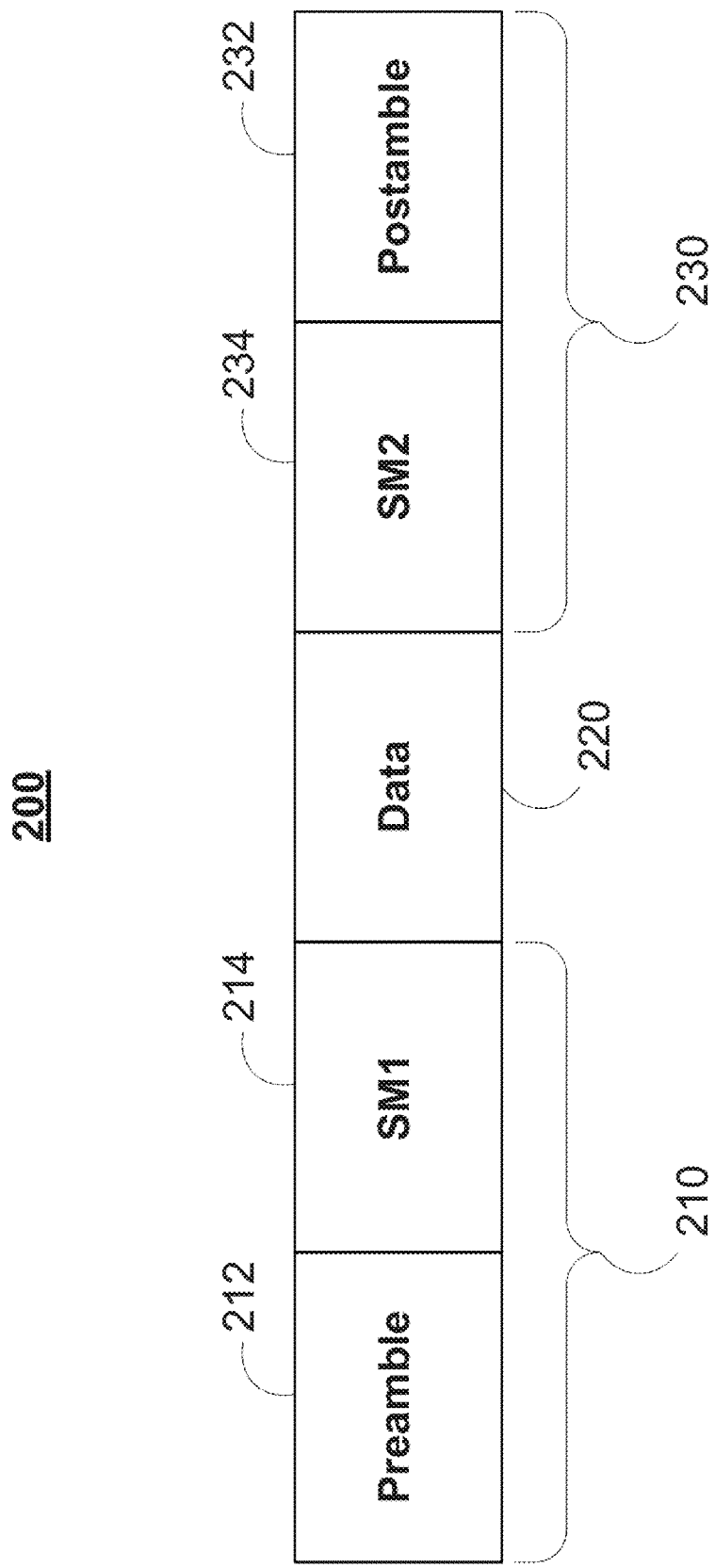
FIG. 2 is a diagram of an illustrative data sector in accordance with an embodiment of the present invention.

FIG. 2 is a diagram of an illustrative data sector 200 in accordance with an embodiment of the present invention. Data sector 200 may be the sector stored on the magnetic storage medium that is read back in analog form and provided to ADC 120 for conversion to digital. Data sector 200 includes timing blocks 210 and 230 and a data block 220. Timing blocks 210 and 230 may be used by system 100 to determine the phase and frequency offset and sample shift adjustment of the asynchronously sampled analog signal.

Timing block 210 includes a preamble portion 212 which may be used to determine the phase adjustment and detect the first sync mark location. Preamble portion 212 may have a pattern that is 64 bits long. The pattern in preamble portion 212 may be, for example, a 4-bit repeating pattern (e.g., "1100"). Preamble portion 212 may be used to compute the phase drift (i.e., phase offset) over the beginning of the sector with a resolution of a fraction of a clock cycle. Timing block 210 also includes a sync mark portion 214 which may be used to determine the sample shift adjustment of the digital samples corresponding to the asynchronously sampled analog signal with a resolution of a clock cycle (e.g., a sample size). Sync mark portion 214 may be 36 bits long and be optimized for correlation sync mark detection or any other suitable purpose.

Similarly, timing block 230 includes a postamble portion 232 which may also be used to determine the phase adjustment associated with the end of the sector and detect a second sync mark portion 234 which may also be used to determine sample shift adjustment. Postamble portion 232 may share the properties (e.g., may be identical) of preamble portion 212. However, postamble portion 232 may be of a different length than preamble portion 212. In particular, postamble portion 232 may have a pattern that is 64 bits long that includes a 4-bit repeating pattern. First sync mark portion 234 may share the properties of second sync mark portion 214.

The output of ADC 120 are the digital samples corresponding to the asynchronously sampled analog signal. The digital samples are stored in storage device 130. In some implementations, storage device 130 may include a buffer that is large enough to store an entire sector read back from a magnetic storage medium. For example, the buffer may have a size that is equal to or greater than the number of bits of a particular sector. In particular, a sector may include a 60-bit preamble block 210 and a 64-bit postamble block 232 (FIG. 2), two 36-bit sync mark blocks 214 and 234 and a 4096-bit data block 220. Accordingly, a suitably sized buffer may be capable of storing 4288 or any other suitable number of bits of asynchronously sampled information. In some embodiments, storage device 120 may be a memory, RAM, DRAM, EPROM, or any other device capable of storing samples which can be accessed within a predetermined time interval.

Figure 3:
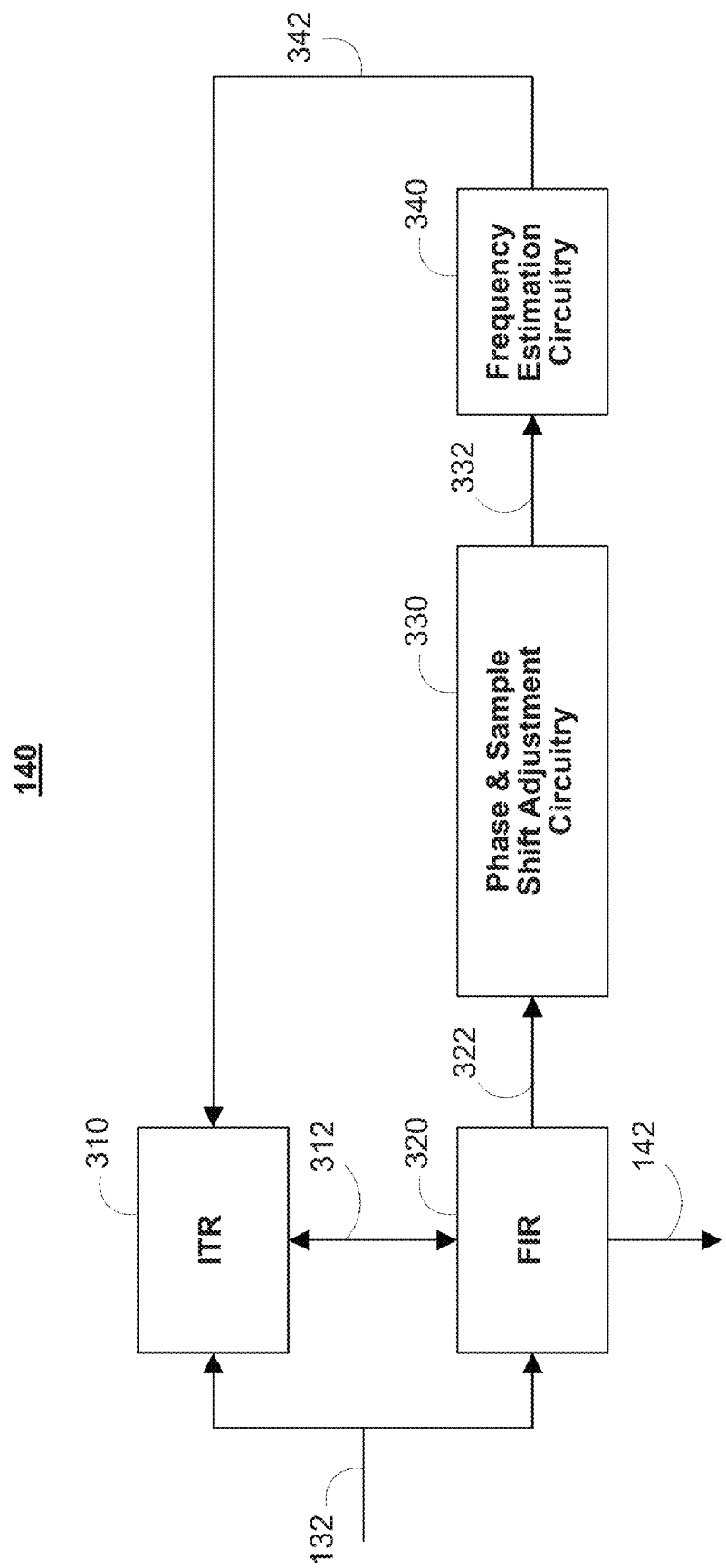
FIG. 3 is a diagram of an illustrative timing recovery circuitry in accordance with an embodiment of the present invention.

As discussed in more detail below, the buffered asynchronously sampled ADC output (e.g., the buffered samples) may be provided to a FIR filter/equalizer 320 (FIG. 3). Phase estimation may be performed at the output of the FIR filter/equalizer. In a first stage, the buffered samples may be processed from two ends of the storage device or buffer 130 (FIG. 1). In particular, the preamble may be retrieved from the beginning of the buffer and onwards and may be used to perform phase estimation. The phase estimation performed based on the preamble may indicate a phase drift associated with the beginning of the sector. The location of the first sync mark (i.e., the sync mark that appears before the data block) may be detected based on the phase estimation associated with the preamble.

Similarly, the postamble may be retrieved from the end of the buffer and backwards and may be used to perform phase estimation. The phase estimation performed based on the postamble may indicate a phase drift associated with the end of the sector. The location of the second sync mark (i.e., the sync mark that appears after the data block) may be detected based on the phase estimation associated with the postamble. A frequency offset estimate may be computed as a function of the phase estimates associated with the preamble and postamble, the locations of the first and second sync marks and a known length of the data block.

In a second stage, interpolated timing recovery circuitry 310 (FIG. 3) may use the frequency offset estimate computed by the first stage as an initial value of the frequency offset register. Interpolated timing recovery circuitry 310 may preferably use the phase estimate associated with the preamble computed by the first stage as an initial value of the phase register. In some alternate implementations, the interpolated timing recovery circuitry 310 may use the phase estimate associated with the postamble computed by the first stage as the initial value of the phase register instead. The second stage may process and interpolate the buffered sector from the beginning to the end based on the frequency offset and the phase estimate and provide the interpolated ADC outputs, through the FIR filter/equalizer 320 to utilization circuitry 150 (FIG. 1) for use in data detection.

Referring back to FIG. 1, it should be understood that although only one storage device 130 is drawn in the figure, storage device 130 may include multiple storage devices that may be accessed independently of one another. In particular, storage device 130 may include multiple equally or unequally sized buffers for storing samples of the asynchronously sampled analog signal(s). In some embodiments, system 100 may operate in a pipeline manner (i.e., operate on multiple pieces of data in parallel) in which one set of samples, corresponding to one analog signal or sector, is processed by a first portion of timing recovery circuitry 140 (e.g., a first finite impulse response (FIR) filter, Zero Phase Sequence (ZPS) circuitries, interpolator, sync mark detectors and frequency estimation circuitry) while another set of samples, corresponding to a different analog signal or sector, is processed by a second portion of timing recovery circuitry 140 (e.g., interpolated timing recovery (ITR) circuitry, a second FIR filter (which may be the same as the first FIR filter) and utilization circuitry 150 (which may include Viterbi computation circuitry). Accordingly, in order to enable the system to operate on multiple pieces of data in parallel (or in a pipeline manner), the first set of samples may be stored and accessed from one buffer (or memory) within storage device 130 while the second set of samples may be stored or accessed from a second buffer (or memory) within storage device 130. This operation will be described in more detail in connection with FIG. 10.

Timing recovery circuitry 140 may access the samples stored in storage device 130. Timing recovery circuitry 140 may determine phase adjustments, sample shift adjustments and estimate a frequency offset based on the samples stored in timing blocks 210 and 230 (FIG. 2). Timing recovery circuitry 140 may include a FIR filter that digitally filters the samples stored in storage device 130 based on a determined phase/frequency and sample shift adjustment. The FIR filter initially provides digitally filtered samples to timing recovery components that determine the phase adjustment (e.g., ZPS components) and sample shift adjustments (e.g., the locations of the sync marks determined by sync mark detectors). Timing recovery circuitry 140 may compute a frequency offset estimate based on the phase adjustments and locations of the sync marks. The samples stored in storage device 130 may subsequently be interpolated based on the determined phase adjustments and frequency offset estimate and the interpolated signal may be filtered again by the FIR filter at the appropriate phase/frequency. The filtered interpolated signal may then be provided to utilization circuitry 150 (e.g., a Viterbi (VTB) component).

Timing recovery circuitry 140 may initially determine a phase adjustment based on a known polynomial (e.g., a sinusoid) that represents ideal values of preamble and postamble blocks 212 and 232 of sector 200. Subsequently, timing recovery circuitry 140 may determine a sample shift adjustment and the locations of the sync marks of the asynchronously stored samples based on the phase adjustment and sync mark blocks 214 and 234 of sector 200. The frequency of the asynchronously sampled sector is estimated based on the phase adjustment and sync mark locations and provided to an interpolator to generate a retimed signal representing the asynchronous samples stored in storage device 130 at the appropriate frequency and phase. As defined herein the term retimed signal means a signal that is generated based on the samples stored in storage device 130 that have been interpolated using the estimated frequency and phase. A FIR filter may be used to filter the generated signal and provide the filtered signal to, for example, VTB circuitry.

Utilization circuitry 150 may receive and process the interpolated time recovered signal from timing recovery circuitry 140. For example, utilization circuitry 150 may include a VTB encoder/decoder unit that operates on the time recovered signal. The output 152 of utilization circuitry 150 may be fed back to timing recovery circuitry 140 in order to operate as a close-loop circuit that that continuously adjusts the phase/frequency and/or gain of subsequently asynchronously sampled sectors.

Control circuitry 160 may provide control signals 162 to any one of system 100 components to control the dataflow through the system. In particular, control circuitry 160 may instruct ADC 120 when to sample and store a particular sector into storage device 130. Control circuitry 160 may receive an indication from timing recovery circuitry 140 that informs control circuitry 160 that a particular asynchronously sampled sector has been retimed. Based on this indication, control circuitry 160 may provide an indication to ADC 120 and storage device 130 that a next sector may be sampled and stored in storage device 130.

In some embodiments, control circuitry 160 may control the flow of data through system 100 when multiple sectors are processed simultaneously in a pipeline manner. For example, where multiple buffers are used in storage device 130, control circuitry 160 may keep track (e.g., by way of a look-up table) of in which buffer particular samples corresponding to different sectors are stored. Control circuitry 160 may provide this information to any component that requires access to the samples of a particular sector.

Each component in system 100 may communicate with another component in system 100 through a common bus or multiple independent buses 162 coupled to each of system 100 components. In particular, it should be understood that that although one common line is drawn connected each of the system components, multiple lines may be provided between each of the components in order to allow any component in the system to communicate with another component at the same time as two other different components are communicating. For example, timing recover circuitry 140 may communicate with either or both storage device 130 and utilization circuitry 150 at the same time as ADC 120 is communicating with storage device 130 and/or control circuitry 160.

After a sector is asynchronously sampled and stored in a buffer, the phase offset and sample shift adjustment (e.g., the locations of the sync marks) are first determined. A frequency offset estimate is computed based on the phase offset and the locations of the sync marks. The stored samples are then interpolated based on the frequency offset estimate and provided to a VTB. In particular, the sampled sector is processed twice. The first time, the sampled sector is processed to determine a phase offset and a sample shift adjustment (cycle offset) in order to perform frequency offset estimation. The second time, the sampled sector is processed to generate a signal (e.g., by way of interpolation) representing the samples based on the frequency offset estimate and the phase offset (e.g., the appropriate frequency).

FIG. 3 is a diagram of an illustrative timing recovery circuitry 140 in accordance with an embodiment of the present invention. Timing recovery circuitry 140 includes ITR circuitry 310, FIR circuitry 320, phase and sample shift adjustment circuitry 330 and frequency estimation circuitry 340. Timing recovery circuitry 140 operates on samples 132 of a sector which timing recovery circuitry 140 may retrieve from storage device 130.

During the first stage (e.g., a first cycle) FIR circuitry 320 processes samples 132 based on the frequency (which may have an offset) used by ADC 120 to sample the analog sector. FIR circuitry 320 may include filters and equalizers. FIR circuitry 320 is used to filter the read back channel 112 based on a target channel. The output 322 of FIR circuitry 320 during the first stage is provided to phase and sample shift adjustment circuitry 330.

Phase and sample shift adjustment circuitry 330 receives output 322 of FIR circuitry 320 and initially determines a phase adjustment of samples 132. Based on the phase adjustment, a sample shift adjustment (e.g., a cycle adjustment) and in turn the locations of the sync marks may be determined. Phase and sample shift adjustment circuitry 330 may determine the location of the first sync mark based on the phase adjustment derived from the preamble of samples 132. Phase and sample shift adjustment circuitry 330 may determine the location of the second sync mark (which may be positioned after the data block) based on the phase adjustment derived from the postamble of samples 132. Since the postamble is positioned as the last block of the samples of the sector, phase and sample shift adjustment circuitry 330 may retrieve the postamble by reading back samples 132 starting with the end of the buffer (e.g., storage device 130). The output 332 (e.g., the phase adjustments and the locations of the first and second sync marks) of phase and sample shift adjustment circuitry 330 is provided to frequency estimation circuitry 340.

Figure 4:
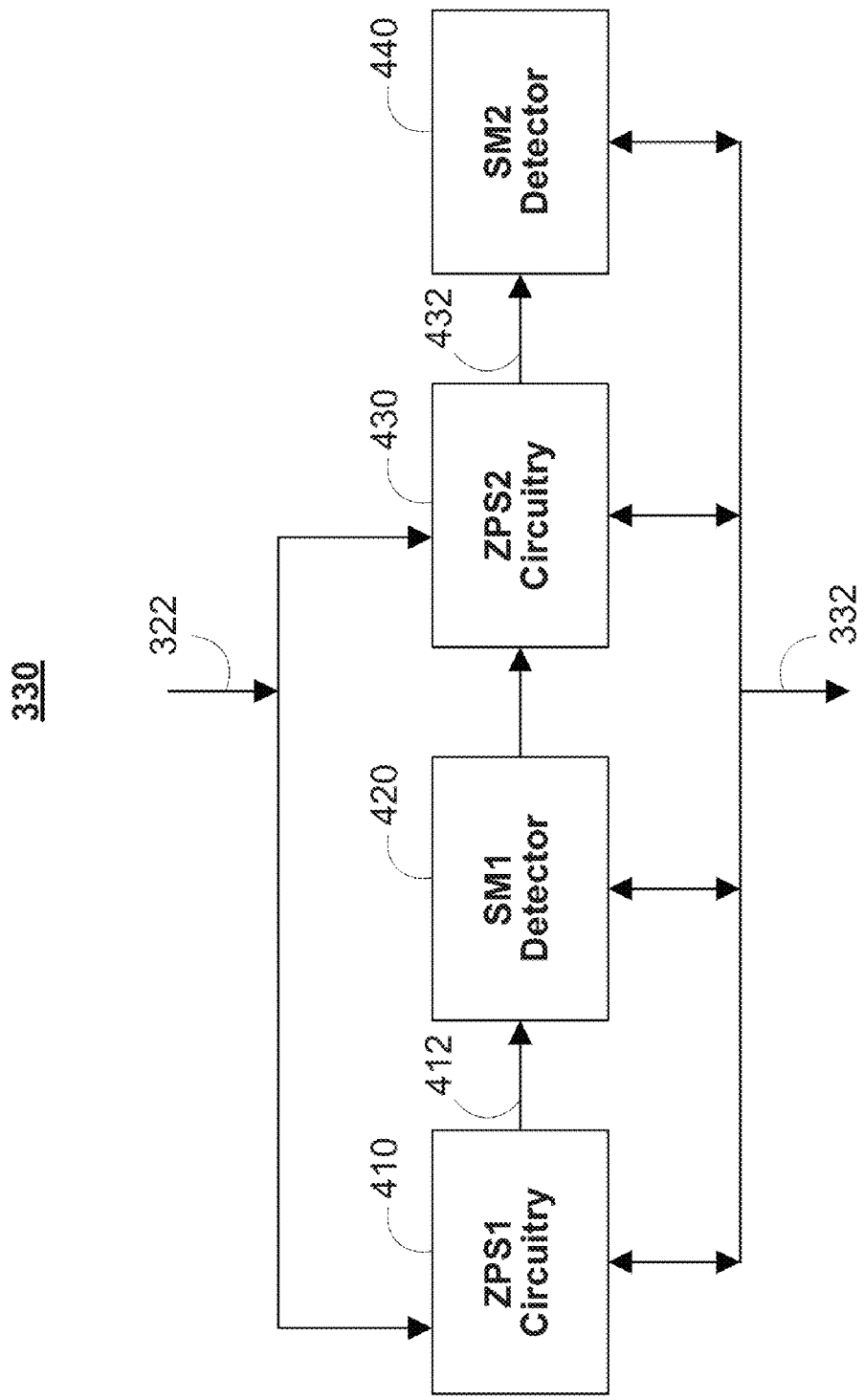
FIG. 4 is a diagram of an illustrative phase and sample shift adjustment circuitry in accordance with an embodiment of the present invention.

FIG. 4 is a diagram of an illustrative phase and sample shift adjustment circuitry 330 in accordance with an embodiment of the present invention. Phase and sample shift adjustment circuitry 330 includes first and second ZPS circuitries 410 and 430 and first and second sync mark detectors 420 and 440. First ZPS circuitry 410 receives the filtered samples 322 and computes a phase adjustment based on the preamble 212 of samples 322 (FIG. 2). Similarly, second ZPS circuitry 430 receives the filtered samples 322 and computes a phase adjustment based on the postamble 232 of samples 322. Each ZPS circuitry 410 and 430 may interpolate samples 322 based on the computed phase adjustment. ZPS circuitries 410 and 430 are described in more detail below in connection with FIGS. 5 and 6. In the implementation described below, two ZPS circuitry 410 and 430 and two sync mark detectors 420 and 440 operate in parallel to compute the phase and sample shift adjustments. In some alternate implementations, one ZPS circuitry 410 and sync mark detector 420 may be used to compute the phase and sample shift adjustment associated with the beginning and the end of the sector in serial. In particular, the one set of ZPS and sync mark detector circuitries can be shared in different time slots to first compute a phase and sample shift adjustment corresponding to the preamble and first sync mark and at a subsequent time slot compute a phase and sample shift adjustment corresponding to the postamble and second sync mark.

Each sync mark detector 420 and 440 receives the interpolated samples 412 or 432 from respective ZPS circuitry 410 or 440. Sync mark detector 420 determines the location of the first sync mark 214 within samples 322 which precedes the data block 220 by computing a sample shift adjustment (FIG. 2). In particular, sync mark detector 420 may compare interpolated samples 412 to an ideal (or expected) vector of samples to determine the number of samples by which to index into samples 322 to reach the first sync mark 214. For example, sync mark detector 420 may compare a first portion of interpolated samples 412 to the ideal vector of samples (each corresponding to the first sync mark shifted by a different number of bits) to determine whether the samples in the portion correspond to the first sync mark or a shifted version of the first sync mark. If the samples in the portion correspond to a shifted version of the first sync mark, an index (e.g., a counter) into samples 322 may be incremented and a second subsequent portion of interpolated samples 412 may be retrieved and compared until a portion is retrieved that corresponds to the first sync mark. The value of the index when the portion matches the first sync mark may represent the location of the first sync mark. Preferably, the portions of interpolated samples are taken every four bits and consequently, the index is advanced by four samples each time the portion matches a shifted version of the first sync mark. In some embodiments, the index is implemented as a modular-4 counter.

Similarly, sync mark detector 440 determines the location of the second sync mark 234 within samples 322 which follows data block 220 by computing a sample shift adjustment. In particular, sync mark detector 440 may compare interpolated samples 432 to an ideal (or expected) vector of samples to determine the number of samples by which to index into samples 322 to reach the second sync mark 234. After the locations of first and second sync marks 214 and 234 are determined, the location of the data block 220 may be known.

It should be understood that the number of data bits in a particular sector may be a predetermined value. Sync mark detectors 420 and 440 are described in more detail below in connection with FIG. 7. The outputs of ZPS circuitries 410 and 430 and sync mark detectors 420 and 440 may be provided as the phase and sample shift adjustment 332 (which may include the locations or indices of the first and second sync marks).

Referring back to FIG. 3, frequency estimation circuitry 340 estimates the frequency offset (e.g., the appropriate frequency without the offset) based on the phase and sample shift adjustments 332. In particular, frequency estimation circuitry 340 may determine whether (and by how much) the sampling frequency used by ADC 120 is offset. Accordingly, the locations of the data bits of the sampled sector may be determined in the second stage (e.g., a second clock cycle).

Frequency estimation circuitry 340 may compute a frequency offset estimate in accordance with the following equation:

$$f = A\_samp/(i_1 + d\_bits + i_2)$$

where f is the estimated sampling frequency; $i_1$ represents the number of samples between the first ZPS performed (i.e., the starting location of the preamble) and the first sync mark that is found (i.e., the location of the first sync mark); $i_2$ represents the number of samples between the second ZPS performed (i.e., the starting location of the postamble measured from the end of the sector) and the second sync mark that is found (i.e., the location of the second sync mark measured from the end of the sector); A_samp is the number of samples between the two ZPS portions (i.e., the number of samples between the starting locations of the preamble and postamble); and d_bits is the number of data bits between the first and second sync marks. The difference between $i_2$ and $i_1$ may indicate the number of buffered samples. It should be understood that $i_1$ and $i_2$ may be non-integer numbers where the fractional portions of the numbers are determined by the phase estimates computed by the respective ZPS circuitry 410 or 440 (FIG. 4). The frequency offset may be determined by computing 1-f. A higher-than-1 value of f may indicate that ADC 120 is sampling the sector too fast and a lower-than-1 value of f may indicate that ADC 120 is sampling the sector too slow.

Figure 8:
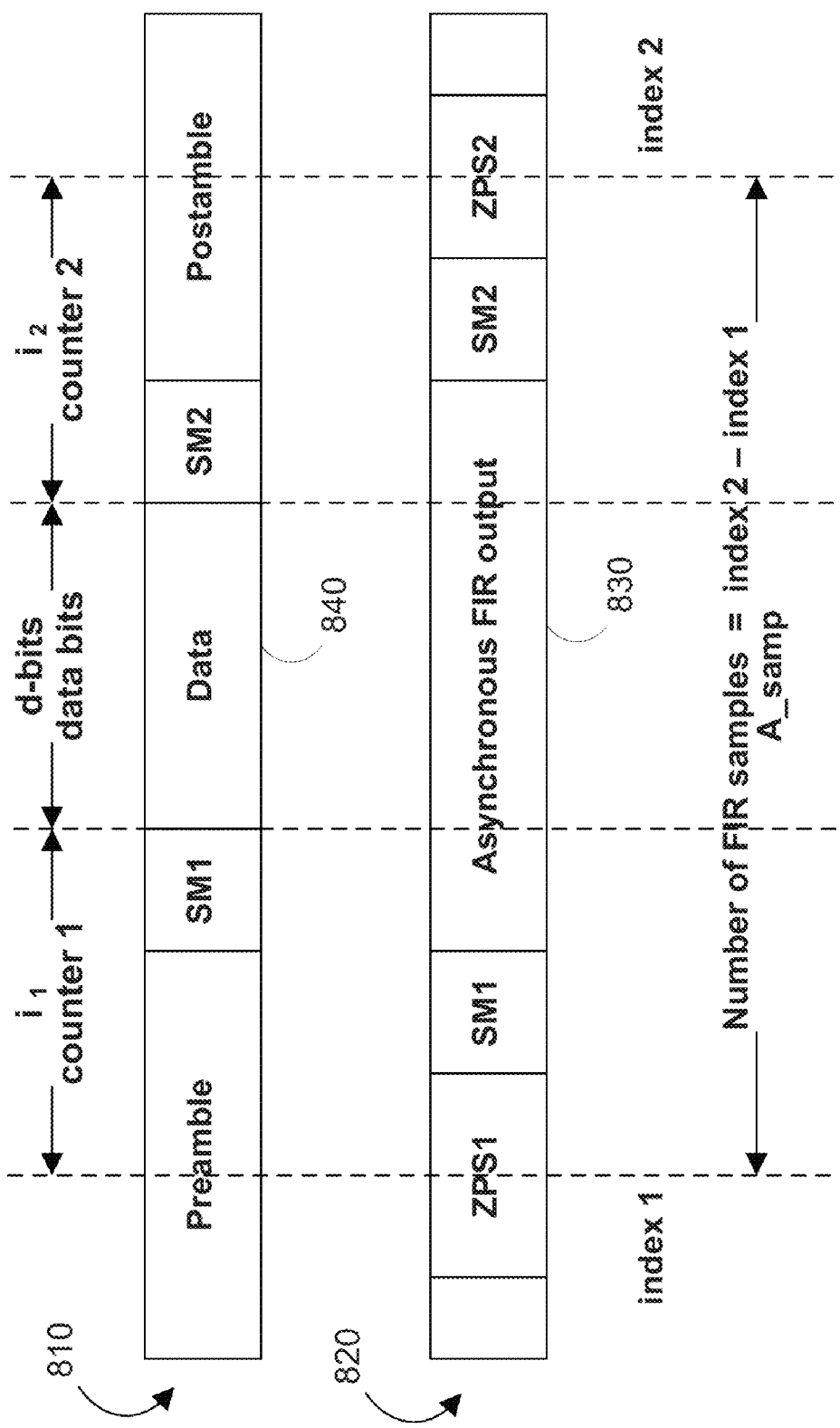
FIG. 8 is a diagram illustrating frequency estimation in accordance with an embodiment of the present invention.

FIG. 8 is a diagram illustrating frequency estimation in accordance with an embodiment of the present invention. FIG. 8 shows an ideal data sector 810 compared with buffered data sector 820 (which corresponds to the samples stored in storage device 130. As shown, $i_1$ corresponds to a counter that counts the number of samples between the start of ZPS1 and the location of the end of the first sync mark and $i_1$ corresponds to a counter that counts the number of samples between the start of ZPS2 and the location of the end of the second sync mark. Index 1 and Index 2 shown in FIG. 8 may indicate the starting and ending positions of the buffer in which the asynchronously sampled sector is stored. As shown in FIG. 8, since the number of data bits provided by the asynchronous FIR output 830 is greater than the number of data bits 840 in the ideal sector, the frequency offset equation above may indicate that the sector is being sampled too fast.

During the second stage, ITR circuitry 310 may receive the frequency estimate (or offset) 342 from frequency estimation circuitry 340 and a phase estimate from ZPS circuitry 410. ITR circuitry 310 may retrieve from storage device 130 the samples of the sector. ITR circuitry 310 may reconstruct the signal 112 based on the asynchronously stored samples 132, frequency estimate 342 and phase estimate (adjustment). In particular, ITR circuitry 310 may include an interpolator which generates a signal representing samples 132 of the sector at the appropriate frequency/phase offset. The output 312 of ITR circuitry 310 may be provided to FIR circuitry 320 for filtering based on the target channel. FIR circuitry 320 may then provide the interpolated time recovered signal 142 (e.g., the signal interpolated based on the frequency estimate) to utilization circuitry 150 (e.g., VTB circuitry).

Accordingly, it has been shown how a sector read back from a magnetic storage medium and asynchronously sampled may be retimed based on the appropriate frequency in three stages. During the first stage, the analog signal representing a sector may be asynchronously sampled and stored in storage device 130. During the second stage, an estimated frequency (e.g., the frequency at the appropriate offset) of the sector sampling may be determined based on a phase adjustment and sync mark locations (by way of sample shift adjustments). During the third stage, the asynchronously sampled sector may be interpolated based on the estimated frequency to provide the samples (or analog signal) retimed at the appropriate phase and frequency. Because the interpolated retiming may be performed in three stages, it is possible to pipeline the process thereby operating on three different sectors in parallel. Pipelining the process may output an interpolated retimed sector every clock cycle after the pipeline is primed (i.e., after a set of samples corresponding to one sector have been processed by all stages of the pipeline).

As discussed above, ZPS circuitries 410 and 430 receive samples of the read back sector and compute a phase adjustment based on the preamble or postamble of the samples (FIG. 4). ZPS circuitries 410 and 430 receive the preamble/postamble samples from FIR filter/equalizer 320 (FIG. 3) which may be designed based on a target channel polynomial. The ideal values for the preamble/postamble may be calculated based on the preamble/postamble data patterns (e.g., a "1100111000" pattern) and the target channel polynomial. The values of the samples received from FIR filter/equalizer 320 may be compared with the values of the ideal samples to determine by how much the phases (or locations in a time axis) are off the ideal. Phase adjustments may then be made accordingly. In particular, ZPS circuitries 410 and 430 can determine the phase drift based on the temporal amount of difference between the actual sample locations and the ideal sample locations.

Figure 5:
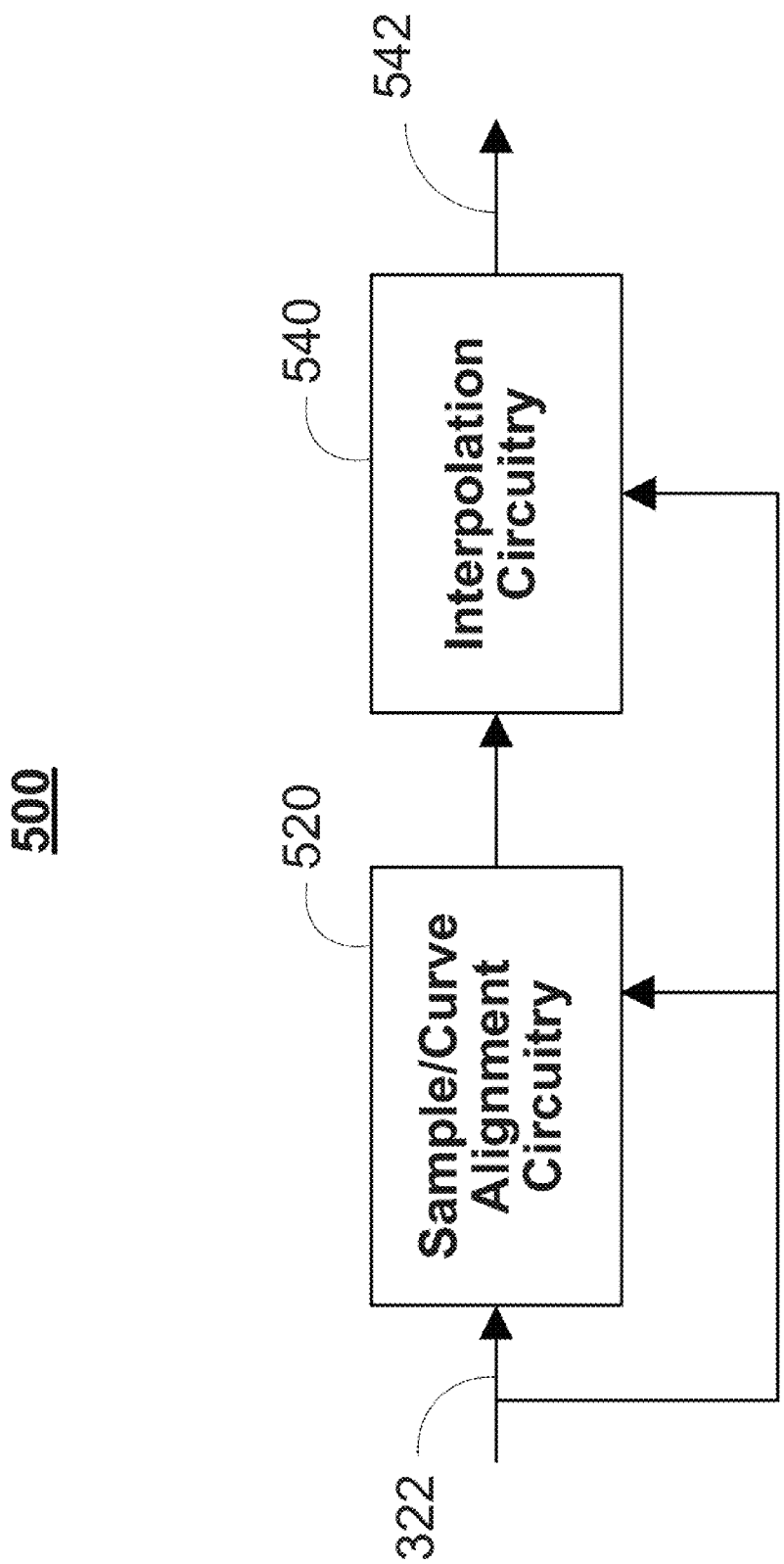
FIG. 5 is a diagram of an illustrative ZPS circuitry in accordance with an embodiment of the present invention.

FIG. 5 is a diagram of an illustrative ZPS circuitry 500 in accordance with an embodiment of the present invention. ZPS circuitry 500 is an exemplary implementation of ZPS circuitry 410 or 430. ZPS circuitry 500 includes sample/curve alignment circuitry 520 and interpolation circuitry 540.

Sample/curve alignment circuitry 520 may be used to determine the temporal amount of difference between the actual sample locations and the ideal sample locations. Sample/curve alignment circuitry 520 may compare a value associated with a particular sample with an expected value. For example, a particular sample may be associated with a value of −7 while the expected or ideal value for the sample is −10. Sample/curve alignment circuitry 520 may measure the distance within a particular clock cycle associated with the sample between the value of the particular sample and the expected value along the polynomial associated with the preamble/postamble to determine a phase adjustment of the sample. The phase adjustment of the sample may be a value between 0 and 1 clock cycles.

Figure 6:
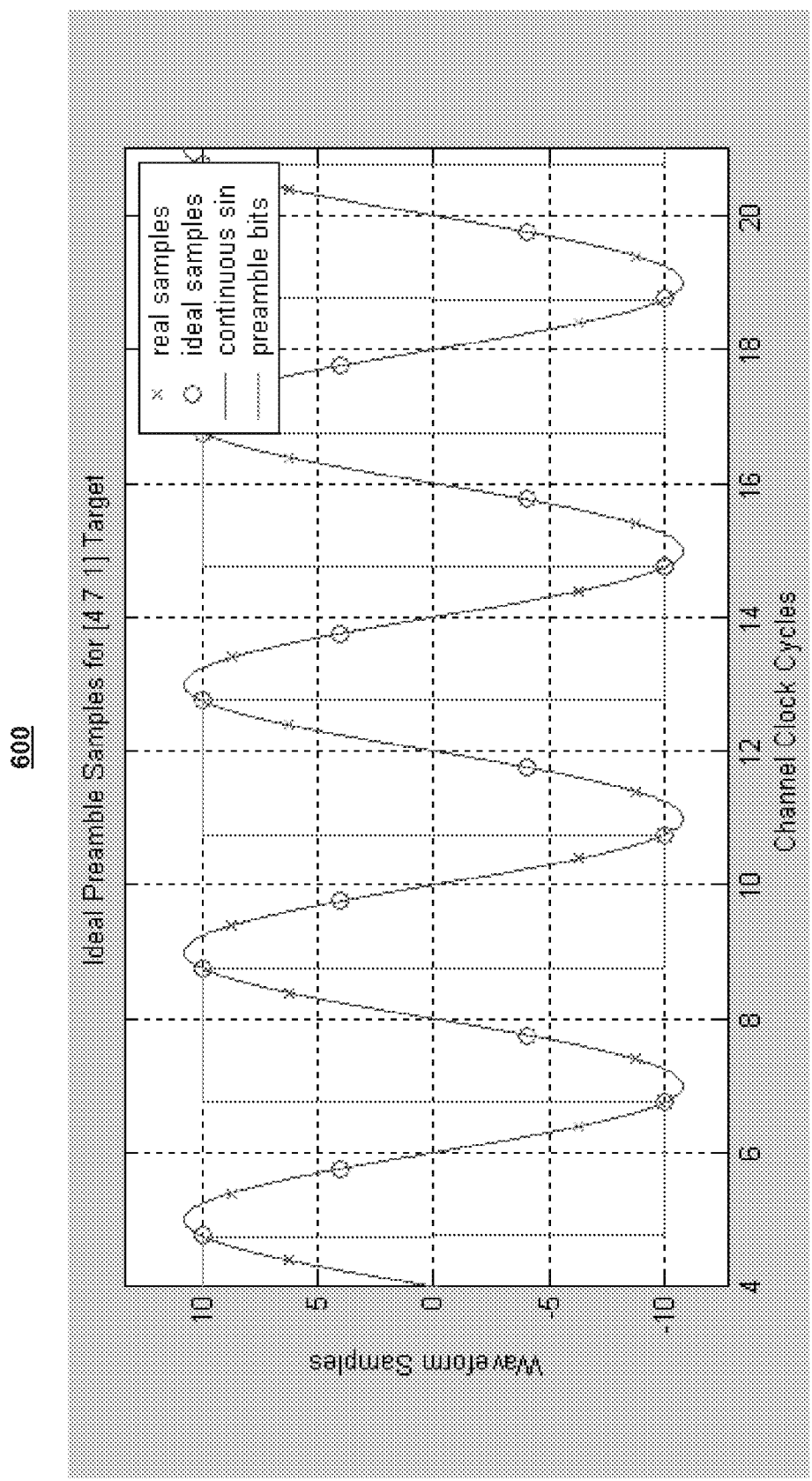
FIG. 6 is a diagram of an illustrative curve alignment circuitry output in accordance with an embodiment of the present invention.

FIG. 6 is a diagram of an illustrative curve alignment circuitry 520 output in accordance with an embodiment of the present invention. In particular, as shown in FIG. 6, sample/curve alignment circuitry 520 has determined and identified the values of the real samples along the curve representing the ideal waveform associated with the preamble/postamble by crosses. Similarly, sample/curve alignment circuitry 520 has determined and identified the values of the ideal samples along the curve representing the ideal waveform associated with the preamble/postamble by circles. It should be understood that the crosses/circles are only used for illustrating where samples are located. In practice, curve alignment circuitry 520 may represent the crosses/circles by binary values/codes stored in a memory or any other suitable way.

Sample/curve alignment circuitry 520 may compute the phase adjustment based on the locations of the ideal versus the real samples along the ideal waveform. For example, sample/curve alignment circuitry 520 may compute the temporal distance between one of the crosses (representing the real sample value) and one of the circles (representing the ideal sample value). Sample/curve alignment circuitry 520 may determine and output the phase adjustment based on the temporal distance between the various points.

In some implementations, sample/curve alignment circuitry 520 may output the phase adjustment by computing a function (e.g., an average, median, maximum, or minimum value) of the temporal distances corresponding to the number of different samples that have been retrieved from the buffer (e.g., 32 sample locations). In some embodiments, sample/curve alignment circuitry 520 may output the phase adjustment by computing one function of the temporal differences (corresponding to multiple sample locations comparisons) when determining the phase adjustment based on the preamble and output the phase adjustment by computing a different function when determining the phase adjustment based on the postamble.

Interpolation circuitry 540 receives samples 322 and the phase adjustment from sample/curve alignment circuitry 520. Interpolation circuitry 540 may reconstruct a discrete-time waveform representing samples 322 at the determined phase and output the reconstructed waveform 542. For example, interpolation circuitry 540 may generate a curve that reconstructs samples 322 at the ideal sampling locations (e.g., the circles shown in FIG. 6). Interpolation circuitry 540 may be implemented as a distinct interpolator, rational interpolator, trigonometric interpolator, multivariate interpolator, Hermite interpolator, spline interpolator, polynomial interpolator, linear interpolator, nearest-neighbor interpolator, any other suitable interpolator or combination thereof.

As discussed above, SM detectors 420 and 440 receive the interpolated samples 412/432 from respective ZPS circuitry 410/440 and determine the location of sync marks 214/234 within samples 322 (FIG. 4). In particular, sync mark detector 420/440 may perform sync mark detection based on signal correlation of the interpolated samples 412/432. For example, sync mark detector 420/440 may compare portions of interpolated samples 412/432 to an ideal (or expected) vector of samples that correspond to the sync marks to determine whether a sync mark is found and consequently an indices into samples 322 that represent the locations of sync marks 214/234.

Figure 7:
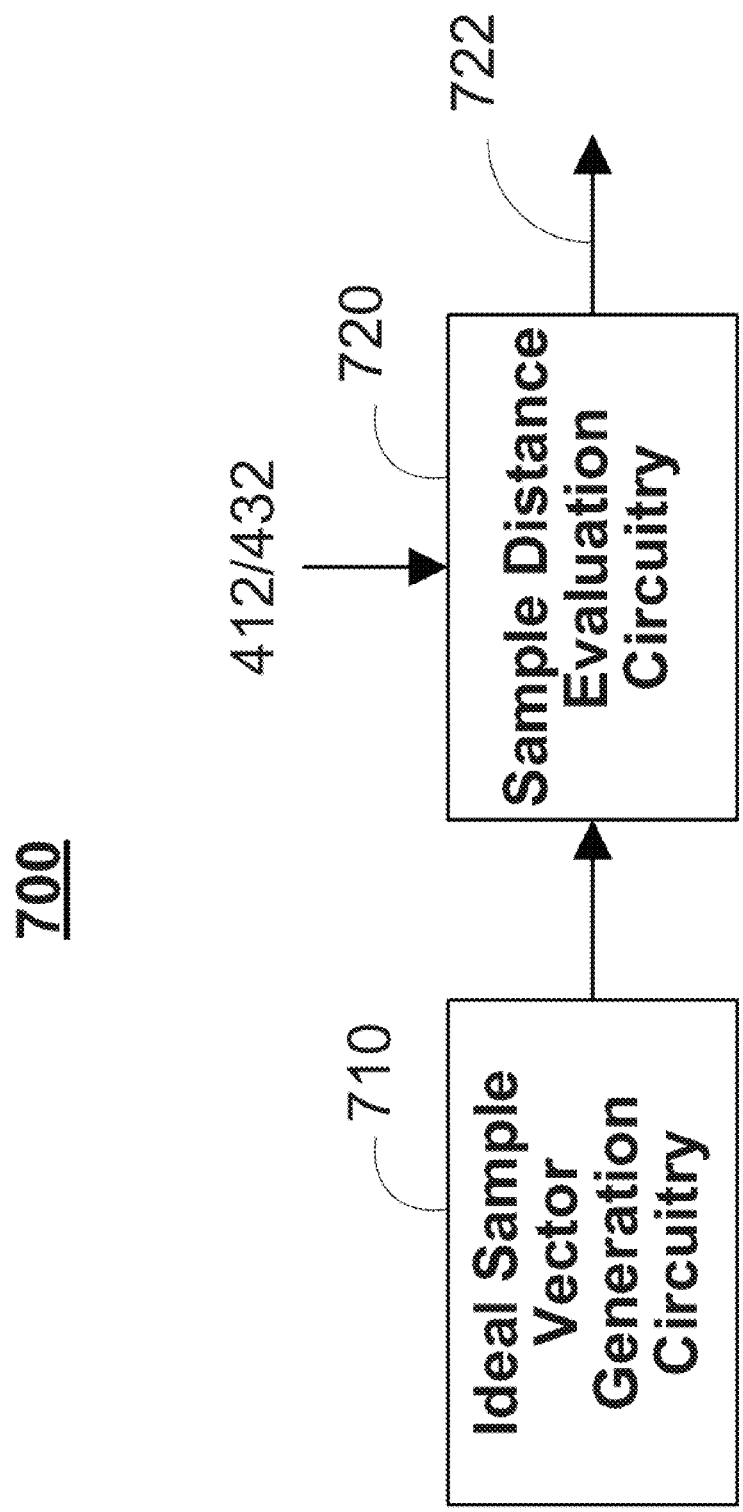
FIG. 7 is a diagram of an illustrative SM detector in accordance with an embodiment of the present invention.

FIG. 7 is a diagram of an illustrative SM detector 700 in accordance with an embodiment of the present invention. SM detector 700 is an exemplary implementation of SM detector 420 or 440. SM detector 700 includes ideal sample vector generation circuitry 710 and sample distance evaluation circuitry 720. In some implementations, SM detector 700 correlates the ideal samples with the interpolated samples only once every four bits to optimize the correlation for noise although any other suitable number of bits may be used (e.g., once every six bits). SM detector 700 will be discussed in the realm of a sync mark that is a multiple of four bits, however it should be understood that the teachings are applicable to a sync mark with any other multiple of bits.

Ideal sample vector generation circuitry 710 may generate a set of vectors representing a predetermined sync mark pattern each shifted by a number of bits of which the sync mark length is a multiple. In some embodiments, the sync mark vectors are shifted by a multiple of the preamble/postamble periods. For example, for a predetermined sync mark having the pattern SM=[(0,0,1,1), (1,1,1,1), (1,1,1,1), (0,0,0,0)] (where the parenthesis indicates a block of bits separated in accordance with the multiple of the sync mark (i.e., in this example the sync mark is a multiple of four bits)), the first vector $u\_0$ may be equal to the SM pattern, the second vector $u\_1$ may be equal to vector $u\_0$ shifted by the multiple of the SM (e.g., shifted by four bits) [(1,1,1,1), (1,1,1,1), (0,0,0,0), (0,0,1,1)] and the third vector $u\_2$ may be equal to the values of $u\_1$ shifted by the multiple of the SM [(1,1,1,1), (0,0,0,0), (0,0,1,1), (0,0,0,0)]. The last vector $u\_i$ in the set of vectors represents the ideal SM vector $u\_0$ shifted by 4*i bits (or the multiple of the SM multiplied by the number of bits in a block of the pattern).

In some implementations, the vectors generated by circuitry 710 may be stored and retrieved from a memory (or look-up table) (not shown) making it unnecessary to generate the ideal vectors for every sector that is read back and sampled.

Generating the set of ideal vectors each shifted by the multiple of the preamble/postamble periods allows SM detector to compare each of the ideal vectors to a portion of the interpolated samples from the ZPS circuitries and determine whether a sync mark is found and consequently the location of the sync mark. For example, when the portion of the interpolated samples is closer to the ideal vector of the preamble/postamble that is shifted by eight bits (i.e., the sample shift adjustment), SM detector may determine that the sync mark is not found and may retrieve the portion of the interpolated samples one period later (e.g., four samples later in time). SM detector may then compare the next portion to the ideal vectors to determine whether the portion is closer to the ideal vector corresponding to the non-shifted sync mark than the vectors of the shifted sync mark. If the portion is closer to the ideal vector corresponding to the non-shifted sync mark, the SM detector may determine that the sync mark is found and provide the location (i.e., the index of the sync mark). The index or location may correspond to the number of portions which have been compared until the sync mark was found.

Sample distance evaluation circuitry 720 may correlate the ideal sample vectors provided by circuitry 710 with a portion of the interpolated real samples 412/432 to determine the sample shift adjustment (or the location of the sync mark). For example, sample distance evaluation circuitry 720 may compute a Euclidian (or any other suitable) distance between each of the ideal vectors and the portion of the interpolated samples 412/432. When the distance between the ideal vector $u\_0$ and the portion of the interpolated samples 412/432 is the minimum, the SM is found. When the distance between ideal vector $u\_1$ and interpolated samples 412/432 is the minimum of all the other distances corresponding to each of the other ideal vectors, distance evaluation circuitry 720 may determine that the SM is not found and may increment a modular-counter or index into samples 130 and retrieve a next portion of interpolated samples 412/432 to continue the search for the sync mark. Sample distance evaluation circuitry 720 may output the sample shift adjustment 722 (or the index of the sync mark or counter value) to another component in the system (e.g., frequency estimation circuitry 340). Sync mark detection using correlation and other techniques is discussed in greater detail in, for example, Ke Han, U.S. patent application Ser. No. 11/910,832, filed Jun. 6, 2007 and U.S. patent application Ser. No. 11/906,655, filed Oct. 2, 2007, each of which is hereby incorporated by reference herein in its entirety.

Figure 9:
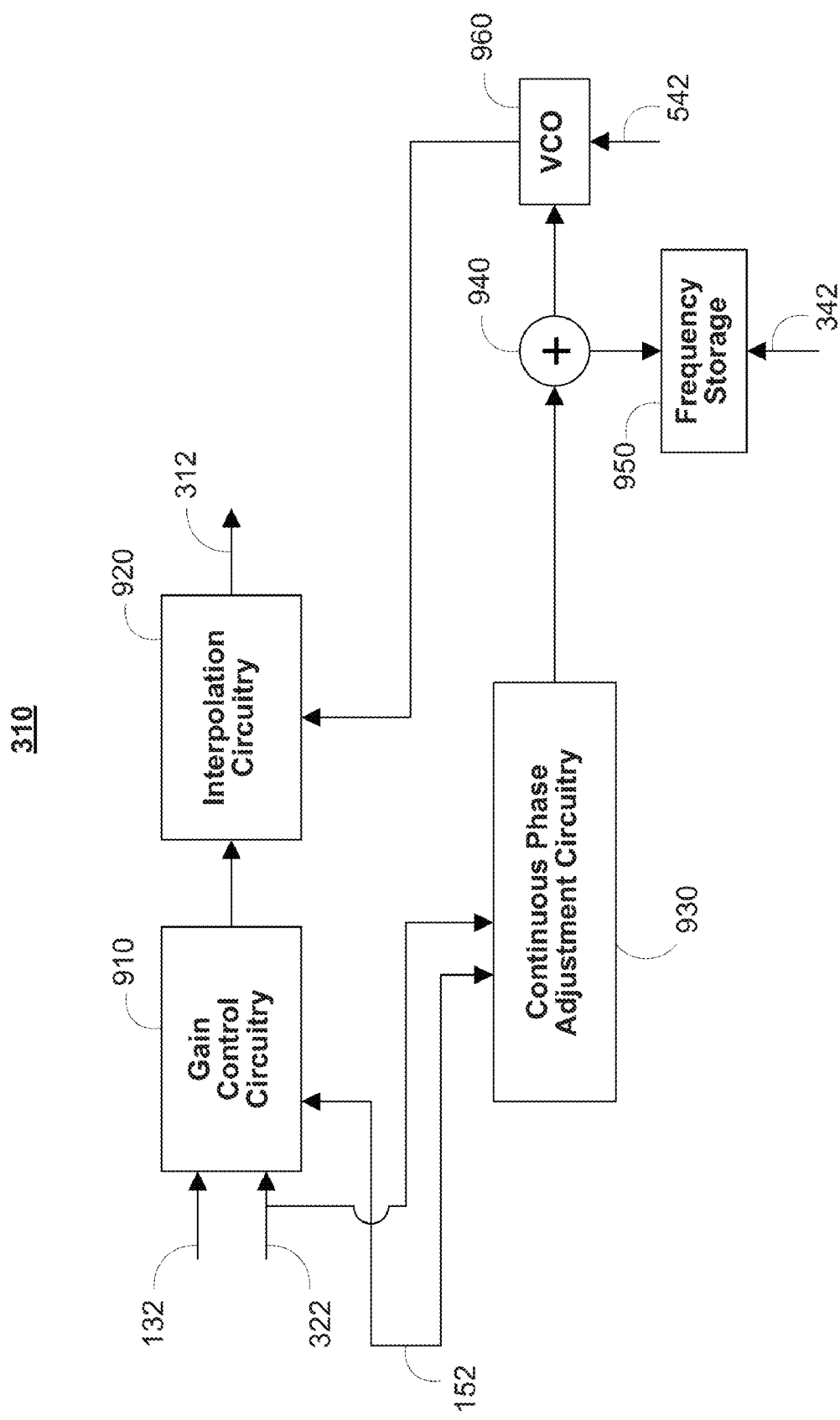
FIG. 9 is a diagram of an illustrative interpolated timing recovery circuitry in accordance with an embodiment of the present invention.

As discussed above, ITR circuitry 310 reconstructs the signal 112 based on the asynchronously stored samples 132 and frequency estimate 342. ITR circuitry 310 processes the samples at the end of the second stage of timing recovery circuitry 140. FIG. 9 is a diagram of an illustrative ITR circuitry 310 in accordance with an embodiment of the present invention. ITR circuitry 310 includes gain control circuitry 910, interpolation circuitry 920, continuous phase adjustment circuitry 930, an adder 940, a frequency storage device 950 and a VCO circuit 960. ITR circuitry 310 may form a closed-loop with utilization circuitry 152 (e.g., a VTB circuit) in order to continuously adjust the phase and gain as different sectors are read back and sampled.

Continuous phase adjustment circuitry 930 may include a phase detector and a phase gain circuit for adjusting the phase used by voltage controlled oscillator (VCO) 960. In some implementations, VCO 960 is realized by algorithms implemented in digital circuitry. In particular, in such implementations, a physical VCO device may not be necessary to provide VCO 960 functionality. In particular, continuous phase adjustment circuitry 930 may receive output 152 of utilization circuitry 150 and filtered asynchronous samples 322. Continuous phase adjustment circuitry 930 may compute a difference in phase between the two signals and provide adjustments if necessary. The output of continuous phase adjustment circuitry 930 is provided to adder 940 which combines the difference in phase with the computed frequency offset estimate stored in frequency storage device 950.

VCO 960 receives the output of adder 940 and provides an adjustment to reconstructed waveform 542 based on any detected phase differences and/or frequency offsets. VCO 960 may be implemented as an integration block.

Gain control circuitry 910 receives samples 132 from storage device 130, filtered samples 322 and output 152 of utilization circuitry 150. Gain control circuitry 910 may be an auto-gain control circuit that adjusts the gain of the samples 132 for optimal processing by interpolation circuitry 920.

Interpolation circuitry 920 receives the phase adjusted (compensated) signal from VCO 960 and gain controlled samples received from circuitry 910. Interpolation circuitry 920 may reconstruct a waveform 312 based on its inputs. Interpolation circuitry 920 may be implemented as a distinct interpolator, brick-wall filter (or sing) interpolator, rational interpolator, trigonometric interpolator, multivariate interpolator, Hermite interpolator, spline interpolator, polynomial interpolator, linear interpolator, nearest-neighbor interpolator, any other suitable interpolator or combination thereof.

Waveform 312 may represent the retimed (phase/frequency adjusted) asynchronous samples 132. Waveform 312 may be the closest representation of the signal that has been originally stored onto the magnetic storage medium and accordingly be reliably processed by utilization circuitry 150. The closed-loop implementation of ITR 310 provides the ability to operate on signals having optimal bandwidths and high amount of noise (e.g., small signal-to-noise ratio).

Figure 10:
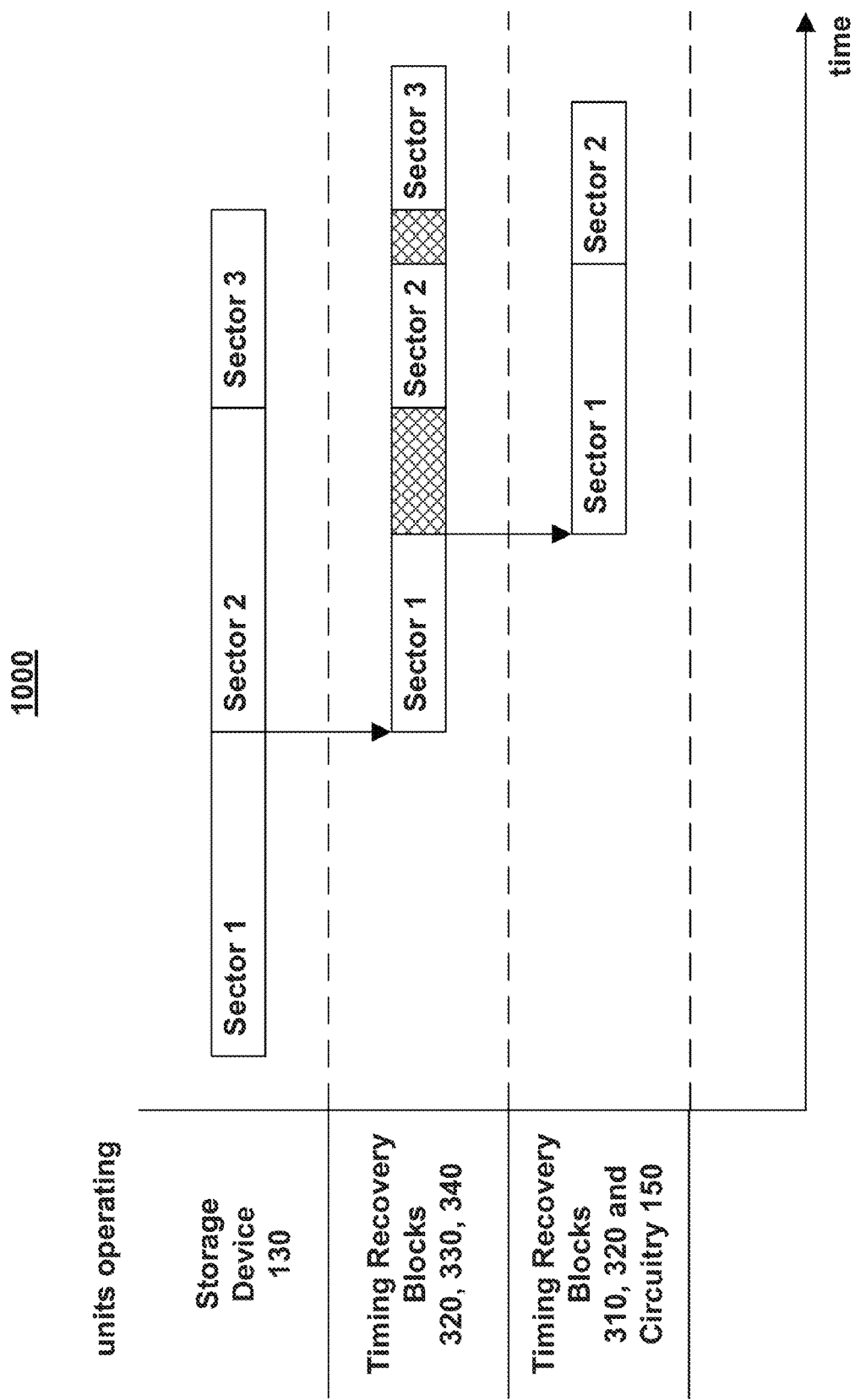
FIG. 10 is an illustrative timing diagram for pipelining interpolated timing recovery in accordance with an embodiment of the present invention.

In some embodiments, interpolated timing recovery system 100 may process multiple sectors in parallel in a pipeline manner. FIG. 10 is an illustrative timing diagram 1000 for pipelining interpolated timing recovery in accordance with an embodiment of the present invention. Initially, in the first pipeline stage, a first set of samples corresponding to a first sector are sampled by ADC 120 and stored in storage device 130. The output of the first stage is provided to a second pipeline stage which includes FIR circuitry 320, phase and sample shift adjustment circuitry 330 and frequency estimation circuitry 340 that operate on the first set of samples.

While the second stage operates on the first set of samples, a second set of samples corresponding to a second sector can be sampled by ADC 120 and stored in storage device 130. The second set of samples may be stored in a separate location (i.e., a different buffer) in storage device 130 since the first set of samples stored in storage device 130 need to be preserved for the third pipeline stage.

During the third pipeline stage, the output of the second pipeline stage (e.g., the frequency estimate of the first set of samples) is processed by ITR 310, FIR 320 and utilization circuitry 150. While the third pipeline stage operates on the first set of samples, the second pipeline stage may processes the second set of samples stored in storage device 130 and the first pipeline stage may sample and store a third sector in storage device 130. The third sector may be stored in the location of the first sector since processing of the first sector samples may be completed by the third stage.

Figure 11:
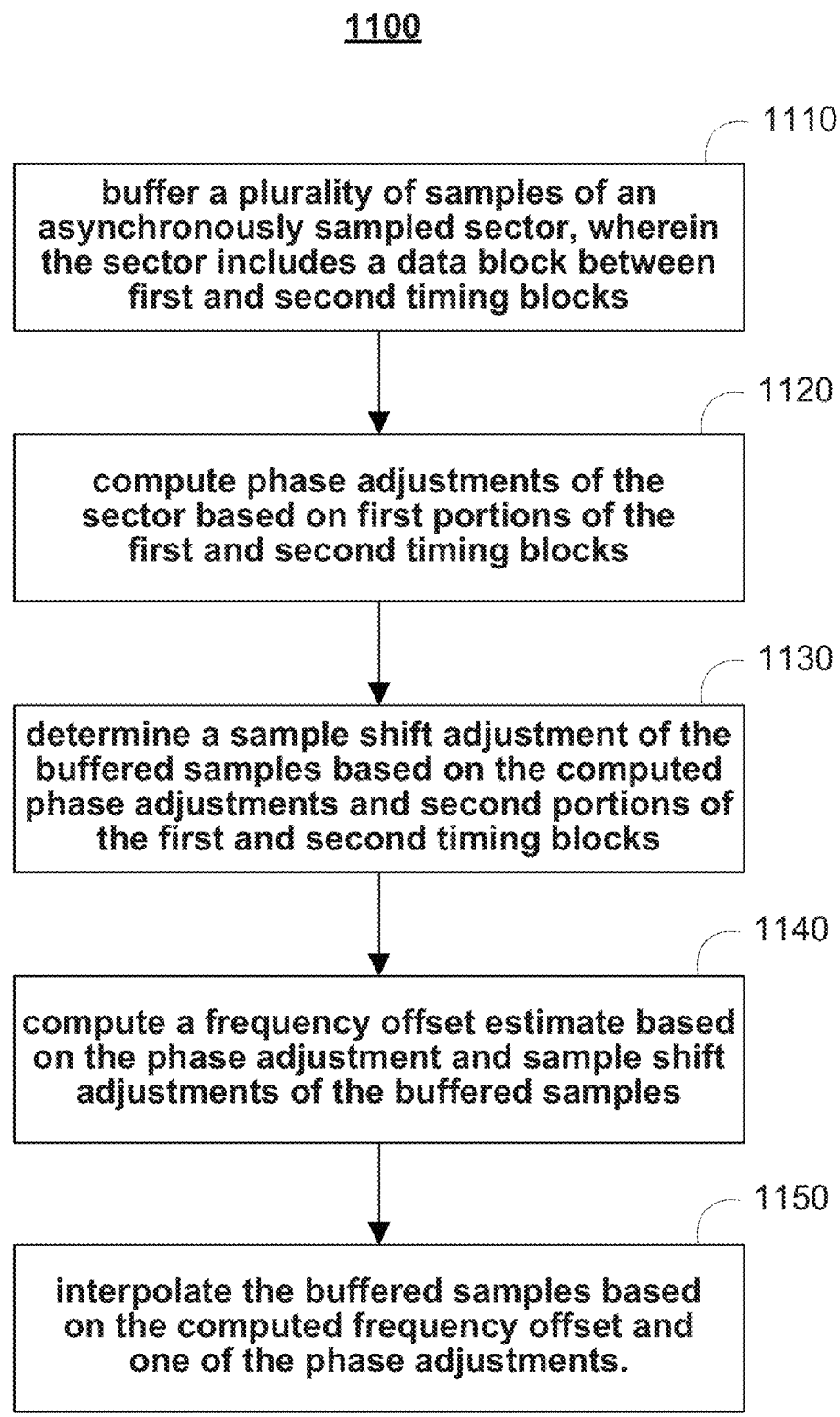
FIG. 11 illustrates a process for performing interpolated timing recovery in accordance with an embodiment of the present invention.

FIG. 11 illustrates a process 1100 for performing interpolated timing recovery in accordance with an embodiment of the present invention. At step 1110, a plurality of samples of an asynchronously sampled sector are buffered, wherein the sector includes a data block between first and second timing blocks. For example, ADC 120 asynchronously samples an analog signal representing a sector stored on a magnetic storage device (FIG. 1). ADC 120 stores the samples to storage device 130 which may be a buffer that has a size equal to the number of samples expected in a sector. The sector includes data block 220 between a first timing block 210 and a second timing block 230 (FIG. 2).

At step 1120, phase adjustments of the sector are computed based on first portions of the first and second timing blocks (e.g., preamble/postamble portions or the timing blocks). For example, ZPS circuitries 410 and 430 may receive respective first portions 212 and 232 of timing blocks 210 and 230 (e.g., portions of the preamble and postamble) (FIG. 4). ZPS circuitries 410 and 430 compute a phase adjustment of the asynchronous samples based on the preamble or postamble by comparing the values of the asynchronous samples with ideal values of the samples and measuring the temporal distance of the values along a continuous polynomial curve (FIGS. 5 and 6).

At step 1130, a sample shift adjustment of the buffered samples (e.g., the locations of the first and second sync marks) is determined based on the computed phase adjustment and second portions of the first and second timing blocks (e.g., the first and second sync marks). For example, SM detectors 420 and 440 receive interpolated samples with the phase adjustment from ZPS circuitries 410 and 440 and respective second portions 214 and 234 of timing blocks 210 and 230 (e.g., SM1 and SM2) (FIG. 4). SM detectors 420 and 440 compare a portion of the interpolated samples of the sync marks with ideal sample sync mark vectors to determine whether a sync mark in the portion of the interpolated samples matches the ideal sync mark vector. If portion matches the ideal sync mark vector (i.e., the non-shifted sync mark vector) the first/second sync mark is found and the location or index is provided. In some implementations, the shift adjustments are made only once every four bits when the bit pattern is a multiple of four bits or the period of the preamble.

At step 1140, a frequency offset estimate is computed based on the phase adjustments and the sample shift adjustments of the buffered samples. For example, frequency estimation circuitry may compute the frequency offset as a function of the phase adjustment associated with the preamble and postamble phases, the locations of the first and second sync marks and the number of samples in the data block (FIG. 3).

At step 1150, the buffered samples are interpolated based on the phase adjustment associated with the preamble and the computed frequency offset estimate. For example, ITR circuitry 310 may receive the frequency estimate, the phase adjustment and the asynchronously stored samples and generate a signal that represents the samples at the appropriate frequency/phase (FIG. 9). The output of ITR circuitry 310 may be filtered and provided to a VTB circuit for further processing.

The foregoing describes methods and apparatus for performing interpolated timing recovery. The above described embodiments of the present invention are presented for the purposes of illustration and not of limitation. Furthermore, the present invention is not limited to a particular implementation. The invention may be implemented in hardware, such as on an application specific integrated circuit (ASIC) or on a field-programmable gate array (FPGA). The invention may also be implemented in software executed by a processor.

What is claimed is:

1. A method comprising:
buffering a plurality of samples of an asynchronously sampled sector, wherein the sector comprises a data block between first and second timing blocks, wherein the first timing block comprises a first portion and a second portion, and wherein the second timing block comprises a first portion and a second portion; and
interpolating the buffered samples based on phase adjustments, associated with a beginning and an end of the sector, computed based on the first portions of the first and second timing blocks.

2. The method of claim 1, wherein interpolating the buffered samples comprises interpolating the buffered samples based on (i) one of the computed phase adjustments, and (ii) a frequency offset of the buffered samples that is computed using sample shift adjustments of the buffered samples and the computed phase adjustments.

3. The method of claim 2, wherein the sample shift adjustments of the buffered samples are determined based on the computed phase adjustments and the second portions of the first and second timing blocks.

4. The method of claim 3, wherein the sample shift adjustments of the buffered samples are determined by:
interpolating a first portion of the buffered samples based on the computed phase adjustments associated with the beginning of the sector to provide a first set of phase adjusted samples;
generating a first plurality of sample vectors that represent ideal samples corresponding to the second portion of the first timing block, each sample vector of the first plurality is shifted by a different number of bits;
correlating subsequent sets of the first set of phase adjusted samples with the first plurality of sample vectors until one of the sets of the first set of phase adjusted samples corresponds to the second portion of the first timing block; and
incrementing a first index representing a starting location of the second portion of the first timing block as each subsequent set is correlated, where the first index corresponds to a sample shift adjustment associated with the beginning of the sector.

5. The method of claim 4, wherein the sample shift adjustments of the buffered samples are further determined by:
interpolating a second portion of the buffered samples based on the computed phase adjustments associated with the end of the sector to provide a second set of phase adjusted samples;
generating a second plurality of sample vectors that represent ideal samples corresponding to the second portion of the second timing block, each sample vector of the second plurality is shifted by a different number of bits;
correlating subsequent sets of the second set of phase adjusted samples with the second plurality of sample vectors until one of the sets of the second set of phase adjusted samples corresponds to the second portion of the second timing block; and
incrementing a second index representing a starting location of the second portion of the second timing block as each subsequent set is correlated, where the second index corresponds to a sample shift adjustment associated with the end of the sector.

6. The method of claim 1, wherein the first portion of the first timing block corresponds to a preamble portion and the first portion of the second timing block corresponds to a postamble portion.

7. The method of claim 6, wherein the second portion of the first timing block corresponds to a first sync mark portion and the second portion of the second timing block corresponds to a second sync mark portion.

8. The method of claim 1, wherein one of the computed phase adjustments is computed by:
comparing a value associated with a first point that represents an ideal sample location of a sample from the first portion of the first timing block with a value associated with a second point that represents an actual sample location of the first portion of the first timing block; and
measuring a temporal distance between the first and second points to determine the computed phase adjustment associated with the beginning of the sector.

9. The method of claim 8, wherein the locations of the first and second points are determined based on a target polynomial and values produced by convoluting the target polynomial with a bit pattern of the first portion of the first timing block.

10. The method of claim 1, further comprising filtering the buffered samples of the asynchronously sampled sector.

11. A system comprising control circuitry configured to:
buffer a plurality of samples of an asynchronously sampled sector, wherein the sector comprises a data block between first and second timing blocks, wherein the first timing block comprises a first portion and a second portion, and wherein the second timing block comprises a first portion and a second portion; and
interpolate the buffered samples based on phase adjustments, associated with a beginning and an end of the sector, computed based on the first portions of the first and second timing blocks.

12. The system of claim 11, wherein the control circuitry is further configured to interpolate the buffered samples based on (i) one of the computed phase adjustments, and (ii) a frequency offset of the buffered samples that is computed using sample shift adjustments of the buffered samples and the computed phase adjustments.

13. The system of claim 12, wherein the sample shift adjustments of the buffered samples are determined based on the computed phase adjustments and the second portions of the first and second timing blocks.

14. The system of claim 13, wherein the sample shift adjustments of the buffered samples are determined by:
- interpolating a first portion of the buffered samples based on the computed phase adjustments associated with the beginning of the sector to provide a first set of phase adjusted samples;
- generating a first plurality of sample vectors that represent ideal samples corresponding to the second portion of the first timing block, each sample vector of the first plurality is shifted by a different number of bits;
- correlating subsequent sets of the first set of phase adjusted samples with the first plurality of sample vectors until one of the sets of the first set of phase adjusted samples corresponds to the second portion of the first timing block; and
- incrementing a first index representing a starting location of the second portion of the first timing block as each subsequent set is correlated, where the first index corresponds to a sample shift adjustment associated with the beginning of the sector.

15. The system of claim 14, wherein the sample shift adjustments of the buffered samples are further determined by:
- interpolating a second portion of the buffered samples based on the computed phase adjustments associated with the end of the sector to provide a second set of phase adjusted samples;
- generating a second plurality of sample vectors that represent ideal samples corresponding to the second portion of the second timing block, each sample vector of the second plurality is shifted by a different number of bits;
- correlating subsequent sets of the second set of phase adjusted samples with the second plurality of sample vectors until one of the sets of the second set of phase adjusted samples corresponds to the second portion of the second timing block; and
- incrementing a second index representing a starting location of the second portion of the second timing block as each subsequent set is correlated, where the second index corresponds to a sample shift adjustment associated with the end of the sector.

16. The system of claim 11, wherein the first portion of the first timing block corresponds to a preamble portion and the first portion of the second timing block corresponds to a postamble portion.

17. The system of claim 16, wherein the second portion of the first timing block corresponds to a first sync mark portion and the second portion of the second timing block corresponds to a second sync mark portion.

18. The system of claim 11, wherein one of the computed phase adjustments is computed by:
- comparing a value associated with a first point that represents an ideal sample location of a sample from the first portion of the first timing block with a value associated with a second point that represents an actual sample location of the first portion of the first timing block; and
- measuring a temporal distance between the first and second points to determine the computed phase adjustment associated with the beginning of the sector.

19. The system of claim 18, wherein the locations of the first and second points are determined based on a target polynomial and values produced by convoluting the target polynomial with a bit pattern of the first portion of the first timing block.

20. The system of claim 11, wherein the control circuitry is further configured to filter the buffered samples of the asynchronously sampled sector.

* * * * *